United States Patent [19]

Verschuur

[11] 4,216,082

[45] Aug. 5, 1980

[54] METHOD FOR PROCESSING A SLURRY OF COAL PARTICLES IN WATER

[75] Inventor: Eke Verschuur, Amsterdam, Netherlands

[73] Assignee: Shell Oil Company, Houston, Tex.

[21] Appl. No.: 827,195

[22] Filed: Aug. 23, 1977

[30] Foreign Application Priority Data

Jan. 7, 1977 [GB] United Kingdom .................. 577/77

[51] Int. Cl.² ............................................. B03B 7/00
[52] U.S. Cl. ..................................... 209/10; 209/268; 406/197
[58] Field of Search ................ 209/5, 10; 210/43, 54, 210/233, 268; 302/66; 406/197

[56] References Cited

U.S. PATENT DOCUMENTS

| | | | |
|---|---|---|---|
| 1,201,143 | 10/1916 | Burks | 209/10 |
| 1,390,230 | 9/1921 | Bates | 302/66 |
| 2,149,748 | 3/1939 | Samuel | 210/43 |
| 2,610,900 | 9/1952 | Cross | 302/66 |
| 3,122,498 | 2/1964 | Werner | 209/3 |
| 3,148,140 | 9/1964 | Kaiser | 210/43 X |
| 3,200,068 | 8/1965 | Jonakin | 209/10 X |
| 3,517,628 | 6/1970 | Harnisch | 302/66 X |
| 3,579,442 | 7/1970 | Gerwig | 209/10 X |
| 3,856,668 | 12/1974 | Shubert | 210/54 |
| 4,021,206 | 5/1977 | Huberts | 241/20 X |

FOREIGN PATENT DOCUMENTS

| | | | |
|---|---|---|---|
| 876860 | 7/1971 | Canada | 209/5 |
| 444577 | 3/1936 | United Kingdom | 209/5 |
| 711105 | 6/1954 | United Kingdom | 302/66 |
| 970489 | 9/1964 | United Kingdom | 209/10 |
| 1388371 | 3/1975 | United Kingdom | 210/44 |
| 1443930 | 7/1976 | United Kingdom | 302/66 |
| 1447034 | 8/1976 | United Kingdom | 302/66 |

*Primary Examiner*—Robert Halper

[57] ABSTRACT

A method for processing a slurry of coal particles in water by dividing the slurry into a coarse fraction including at least substantially the coarser coal particles and a fine fraction including at least substantially the finer coal particles, reducing the water content of the coarse fraction, and separately stabilizing the fine fraction by addition of coal particles alone or coal particles suspended in water or oil, or by reduction of the water content of the fine fraction.

1 Claim, No Drawings

METHOD FOR PROCESSING A SLURRY OF COAL PARTICLES IN WATER

BACKGROUND OF THE INVENTION

The invention relates to a method for processing a slurry of coal particles in water. Aqueous coal slurries are obtained for instance in coal and brown coal mines, in the processing of coal (such as the deashing of coal or the dewatering of brown coal) and at the end of a pipeline in which the coal is transported as a slurry of powder or fines suspended in water. In most cases these coal slurries contain such a large quantity of water that as such they are unsuitable for use, for instance as a fuel. In many cases the coal slurries contain coal particles with a relatively continuous particle size distribution (e.g. of from 0 to 10 mm). Such slurries are often dynamically stable, which renders them suitable for pipeline transport, but statically unstable, so that they cannot be stored or transported by ship without the coal particles settling and the slurry becoming unpumpable.

Therefor, prior to use, storage or transport by ship such slurries have to be brought to a more usable form. To this end the coal slurry can in many cases be wholly or partly dewatered, so that a dry or wet solid cargo or a statically stable slurry is obtained.

However, a drawback of this direct dewatering is that it is very expensive, especially when the particle size distribution in the slurry is continuous. The whole slurry has then to be subjected to one or more treatments, which treatments are not always the optimum for all coal particles. When, for instance, a pipeline slurry has to be made suitable for transport by ship the following problems arise:

- transport of the slurry itself by ship is not economical, in view of the high water content, while also segregation may occur, which will cause considerable problems when unloading the ship;
- mechanical dewatering of the slurry to an economically acceptable water content (for instance to a water content of 25 weight percent) yields a paste-like sticky mass which is very difficult to handle (no longer pumpable);
- continued thermal drying until a visually dry, solid cargo is obtained (having a water content of, for instance, less than 12 weight percent) gives a sufficient improvement in handleability but presents a dust problem, while, moreover, thermal drying of the whole cargo to such a water content is very expensive.

The present invention aims at solving these problems and providing a cheap, reliable alternative for processing such aqueous coal slurries.

SUMMARY OF THE INVENTION

To this end, according to the invention, the slurry is divided into a coarse fraction comprising at least substantially the coarser coal particles and a fine fraction comprising at least substantially the finer coal particles. The water content of the coarse fraction is then mechanically reduced and the fine fraction is worked up to a stable water-containing slurry with a lower water content than the fraction itself.

In this way two products are obtained viz, a coarse and a fine fraction, which fractions may each be further dewatered and further treated if desired, in the most appropriate way. It should be noted here that the complete or partial dewatering of the coarse fraction is much cheaper than that of the fine fraction, the latter being worked up to a stable slurry, which does not require too much dewatering. A slurry of coal particles in water contains in most cases a high to a very high percentage (by weight) of particles which, for the purpose of the present invention, form part of the coarse fraction, so that the greater part of the coal can be dewatered in an inexpensive way, thanks to the absence of the finer coal particles that would interfere.

DESCRIPTION OF PREFERRED EMBODIMENTS

According to a preferred embodiment of the invention the coarse fraction comprises substantially coal particles larger than 0.1 mm and the fine fraction substantially coal particles smaller than 0.1 mm. In this way a practical separation is achieved, which, for the aqueous coal slurries occurring in practice, will often mean, that at least 80 weight percent of coal will form part of the coarse fraction. What is also achieved then is that the coarse fraction can be dried to an acceptable water content in an inexpensive way and without dust problems or insufficient handleability of the product obtained. The resultant fine fraction is easily worked up to a stable slurry.

According to a specific embodiment of the invention the slurry of coal particles in water is divided into two fractions by feeding the slurry to a separator in which the coarser coal particles together with a relatively small quantity of water are separated from the slurry introduced, these separated coarser particles together with the relatively small quantity of water forming the coarse fraction and the rest of the slurry the fine fraction.

This separation is preferably carried out in a centrifuge or on a filter.

It is precisely the separation of a coarse fraction containing relatively little water that can be carried out in a technically simple way and that is—because the coarse fraction will contain the greater part of the coal—economically the most attractive, since it will be relatively inexpensive to dewater this coarse fraction still further to the desired water content, because little water is present in the coarse fraction.

Preferably, the water content of the coarse fraction is reduced until a stream of solid coal particles is obtained. Such a product may, for instance, simply be transported by ship. Such a solid cargo need not be dried entirely. The water content of the coarse fraction may be reduced, for instance, to between 8 and 12 weight percent. The coal cargo is then solid, easy to handle and does not give rise to dust problems. Dewatering to this water content can very well be effected by mechanical means, such as a centrifuge or filter, whereas further dewatering would become much more difficult and expensive and would have to be carried out for instance thermally.

According to a specific embodiment of the invention the fine fraction is worked up to a stable slurry by adding to this fraction solid coal particles or coal particles suspended in water or oil. It is possible that after this addition the mixture will have the proper water content, so that a considerable saving is obtained, since no dewatering treatment is necessary any more. Alternatively, according to this embodiment of the invention, it is possible, before or after addition or coal particles to dewater the fine fraction further and/or to treat it otherwise, for instance to deash it.

Generally, the fine fraction—upon separation from the coarse fraction—will have a relatively high water content, e.g. above 75 weight percent water.

The stable slurry prepared from the fine fraction according to the method of the invention may be ready for use as a fuel. It is possible, for instance, to prepare a fuel which consists of coal powder, oil and water and which is stable, pumpable and can be atomized in a burner.

An alternative to the aforementioned embodiment of the invention concerns the case where the fine fraction is worked up to a stable slurry by direct reduction of the water content of this fraction itself. An advantage of this process is that no other base materials are required for the preparation of the stable slurry from the fine fraction.

One of the possibilities of effecting this direct reduction of the water content is that the fine fraction is introduced into an agglomeration device in which it is contacted under turbulent conditions with a binder based on hydrocarbons or prepared from coal to form agglomerates of coal particles and binder, that the agglomerates are separated from at least part of the water and that the agglomerates, as such or after disintegration, are worked up with water to form the aforementioned stable slurry with a lower water content than the fine fraction.

If desired, the binder may be recovered and recycled. An advantage of reducing the water content by agglomeration is that at the same time it creates the possibility of deashing the coal, for the ash is not taken up in the agglomerates but discharged along with the water separated from the agglomerates.

It is also possible to effect the direct reduction of the water content of the fine fraction by thermal or mechanical thickening, such as thermal drying, filtering or centrifuging. In practice it would for example be possible to reduce the water content from above 80 weight percent to about 55 weight percent by sedimentation and then to about 45 weight percent (minimum water content for handling slurries with normal pumps) by further dewatering a part of the fine fraction and mixing the dewatered part back.

In combination with other measures, such as those mentioned hereinbefore, or as an exclusive measure, it is possible during working up of the fine fraction to a stable slurry to add hydrocarbons which will eventually form part of the stable slurry. It is also possible during working up of the fine fraction to add part of the product obtained from the coarse fraction by reduction of the water content. This will, of course, lower the water content of the fine fraction. This measure will as a rule be taken in combination with one of the measures for working up the fine fraction already described hereinbefore.

The invention will be further elucidated hereinafter with reference to the Examples.

EXAMPLE I

An aqueous suspension of coal particles, containing 51 weight percent solids having particle sizes between 0.0 and 1.2 mm mainly, was passed through a sieve having a mesh size of 0.15 mm. The particles that were left on the sieve have subsequently been rinsed with water in order to prevent that any particles smaller than 0.15 mm were left behind on the sieve.

The mass of particles that was ultimately removed from the sieve contained 40 weight percent water and was further dewatered in a centrifuge to a water content of 7 weight percent.

The part of the suspension that passed through the sieve and accordingly contained solids of below 0.15 mm diameter only, was left untouched for a few days to effect a sedimentation. After removal of an upper layer of relatively clear water, a free flowing liquid slurry was obtained containing 44.5 weight percent solid material.

One third of the total amount of slurry thus obtained was passed through a filter whereby a filter cake was obtained containing 79 weight percent solids. After mixing this cake back into the rest of the slurry, an aqueous coal slurry was obtained, containing 56 weight percent solids, that was statically and dynamically stable and that was yet pumpable.

EXAMPLE II

In the same manner as in Example I a slurry was obtained, of particles below 0.15 mm in size, that contained 44.5 weight percent solid material.

The slurry was brought into turbulent motion while adding an amount of oil having a viscosity of 800 sec. Redwood, whereby agglomerates of coal and oil were formed that could subsequently be removed from the aqueous phase on a sieve. Part of the ash that was originally present in the coal suspension was left in the aqueous phase.

The agglomerates were then dispersed, while disintegrating, in an additional amount of oil and thereby a stable dispersion of coal particles in oil was formed that contained some water: 46 weight percent coal, 44 weight percent oil and 10 weight percent water. The coal proved to have an ash content of 8.5 weight percent.

The viscosity of this dispersion was about 600 cSt at room temperature.

The slurries obtained in this and the preceding Example proved to be economically transportable and useful products.

What is claimed is:

1. A process for preparing a statically stable coal slurry, suitable for use, storage or transport by ship, from a dynamically stable coal slurry, suitable for pipeline transport, comprising, dividing the dynamically stable slurry into at least two fractions by substantially extracting coarser coal particles larger than 0.1 mm together with a relatively small quantity of water from finer coal particles smaller than 0.1 mm with a relatively large quantity of water, and increasing the ratio of coal particles to water in the fine fraction by dewatering part of the fine fraction and mixing the dewatered part with the remaining part of the fine fraction.

* * * * *